(12) United States Patent
Pinkas et al.

(10) Patent No.: US 7,703,130 B2
(45) Date of Patent: Apr. 20, 2010

(54) SECURE AUTHENTICATION SYSTEMS AND METHODS

(75) Inventors: Binyamin Pinkas, Jersey City, NJ (US); Tomas Sander, New York, NY (US)

(73) Assignee: Intertrust Technologies Corp., Sunnyvale, CA (US)

( * ) Notice: Subject to any disclaimer, the term of this patent is extended or adjusted under 35 U.S.C. 154(b) by 438 days.

(21) Appl. No.: 11/781,210

(22) Filed: Jul. 20, 2007

(65) Prior Publication Data

US 2008/0016551 A1    Jan. 17, 2008

Related U.S. Application Data

(63) Continuation of application No. 10/423,531, filed on Apr. 25, 2003, now Pat. No. 7,383,570.

(60) Provisional application No. 60/375,022, filed on Apr. 25, 2002.

(51) Int. Cl.
   *H04L 29/06*    (2006.01)
(52) U.S. Cl. ............................................. 726/7; 726/19
(58) Field of Classification Search ................... 726/1, 726/2, 5, 7, 18, 19
   See application file for complete search history.

(56) References Cited

U.S. PATENT DOCUMENTS

| 5,289,540 | A  | 2/1994 | Jones         |
|-----------|----|--------|---------------|
| 5,313,637 | A  | 5/1994 | Rose          |
| 6,718,328 | B1 | 4/2004 | Norris        |
| 7,383,570 | B2 | 6/2008 | Pinkas et al. |
| 2002/0120853 | A1 | 8/2002 | Tyree      |
| 2003/0115017 | A1 | 6/2003 | Sun et al. |
| 2008/0134323 | A1 | 6/2008 | Pinkas et al. |
| 2008/0184346 | A1 | 7/2008 | Pinkas et al. |

OTHER PUBLICATIONS

Naor, "Verification of a human in the loop or Identification via the Turing Test", Sep. 1996, Retrieved from the Internet on Nov. 20, 2009: <URL: http://www.wisdom.weizmann.ac.il/~naor/PAPERS/human.pdf>.*

Baird et al., "Pessimal Print: A Reverse Turing test", Sep. 2001, Retrieved from the Internet on Nov. 20, 2009: <URL: http://www.aladdin.cs.cmu.edu/papers/pdfs/y2001/pessimalprint.pdf>.*

Office Action mailed Feb. 2, 2006, for U.S. Appl. No. 10/423,531, filed Apr. 25, 2003.

Office Action mailed Aug. 9, 2006, for U.S. Appl. No. 10/423,531, filed Apr. 25, 2003.

(Continued)

*Primary Examiner*—Minh Dinh
(74) *Attorney, Agent, or Firm*—Finnegan, Henderson, Farabow, Garrett & Dunner, LLP

(57) ABSTRACT

Systems and methods are provided for authentication by combining a Reverse Turing Test (RTT) with password-based user authentication protocols to provide improved resistance to brute force attacks. In accordance with one embodiment of the invention, a method is provided for user authentication, the method including receiving a username/password pair associated with a user; requesting one or more responses to a first Reverse Turing Test (RTT); and granting access to the user if a valid response to the first RTT is received and the username/password pair is valid.

42 Claims, 4 Drawing Sheets

OTHER PUBLICATIONS

Office Action mailed Oct. 31, 2007, for U.S. Appl. No. 10/423,531, filed Apr. 25, 2003.
Notice of Allowance mailed Feb. 25, 2008, for U.S. Appl. No. 10/423,531, filed Apr. 25, 2003.
Office Action mailed Oct. 1, 2008, for U.S. Appl. No. 11/926,803, filed Oct. 29, 2007.
Coates, "Pessimal print: a reverse Turing test," IEEE Xplore: pp. 1154-1158 (2001).

* cited by examiner

SECURE AUTHENTICATION SYSTEMS AND METHODS

RELATED APPLICATIONS

This is a continuation of commonly assigned U.S. application Ser. No. 10/423,531, filed Apr. 25, 2003, now U.S. Pat. No. 7,383,570 which claims the benefit of U.S. Provisional Application No. 60/375,022 entitled "Secure Authentication Systems And Methods," filed Apr. 25, 2002, which is hereby incorporated by reference in its entirety.

COPYRIGHT AUTHORIZATION

A portion of the disclosure of this document contains material that is subject to copyright protection. The copyright owner has no objection to the facsimile reproduction of the patent document or the patent disclosure, as it appears in the Patent and Trademark Office files or records, but otherwise reserves all copyrights whatsoever.

FIELD OF THE INVENTION

The present invention relates generally to the use of passwords for authentication. More specifically, embodiments of the present invention use a unique authentication scheme that combines Reverse Turing Tests (RTTs) with password-based user authentication protocols to provide improved resistance to brute force attacks.

BACKGROUND

Passwords are the most common user authentication method, and they will most likely continue to be widely used. Although more secure authentication schemes have been suggested, such as using smartcards or public key cryptography none has gained the widespread adoption that passwords have in the consumer market. Yet passwords are inherently insecure, since the domain from which human passwords are chosen is typically rather small. An adversary can thus try to log into an account using all the most likely passwords until it finds the correct one.

Countermeasures that can be used against such attacks include, (1) Timing: for example, given a login name/password pair, the server provides a slightly delayed yes/no answer, such as a no faster than one answer per second. This prevents an attacker from checking many passwords in a short amount of time.

(2) Account Locking: for example, after a few unsuccessful login attempts to a single account, the account is blocked. For example, an account could be blocked for an hour after 5 unsuccessful attempts.

The above-listed countermeasures may not be as effective when a potential attacker is not as interested in breaking into a specific account as he is concerned with breaking into any possible account. An attacker that tries to break into several accounts in parallel may be able to circumvent a timing countermeasure because user logins are typically handled by servers managing many login sessions in parallel. Therefore, the attacker tries logging into many accounts in parallel, trying multiple user name/password pairs per second. In addition, the account-locking feature may be circumvented since the attacker can try to log into an account using different user name/password pairs without using the same user name twice. Since each username is only used once or twice, the threshold for locking out a user based on failed login attempts is never triggered.

Attacking the account-locking countermeasure is further simplified since an attacker may be readily able to gain access to a large base of valid user names. A list of usernames is often known in interactive web communities, such as auction sites. In many large corporations user names equal the email handle and can just be grabbed off corporate web sites or employee lists. For large Internet services (e.g., MyYahoo) almost any reasonable user name has already been taken, i.e., valid user names are easy to guess for an attacker. The latter applies to any Internet service with a huge user base. Furthermore, valid bank account numbers are often easy to generate, as only part of them is random (parts of the account number are used to identify the branch, and one digit is used for a checksum). Thus, it is relatively easy to generate a valid user name for Internet banking services that use account numbers as user names.

Another major drawback of the account-locking feature is that it can create a denial of service attack against the user. These attacks are mounted by trying to login into a user's account several times with invalid password, thereby causing the account to be blocked. In the consumer space, there have been reports of denial of service attacks in auctions, where in the end phase (where most of the action happens), some users have managed to lock out competing bidders. In addition, the account locking feature is susceptible to inadvertent lockup, such as by users that do not type their passwords correctly. The service provider may need to maintain customer service centers to manage calls from users whose accounts have been locked up inadvertently, and the cost of running such services can be very expensive.

Broad password dictionary attacks generally require a large number of attempts, and thus need to be automated. The present invention makes it difficult or impossible to mount these automated attacks successfully with reasonable resources. In one embodiment, the security of the authentication scheme against "broad password attacks" does not require small lockout limits. For example, the lockout limit can be raised significantly, from 3 to 50 (or to any other suitable number, such as 500 or even higher). Moreover, this can be combined with timing methods—like requiring a 10 second window between two consecutive login attempts into the same account, such that denial of service attacks can not be performed in a few seconds. If the number of failed login attempts is counted at the server, a flag may be raised. A security administrator (or an automated program) can thus conclude with relative certainty that a denial of service attack has been attempted, and can be given more time to react.

Embodiments of the present invention thus provide for much better protection against denial of service attacks. Using the protocols set forth herein, the threshold that triggers an account to be locked up can be set to a very high value, without substantially affecting security.

SUMMARY OF THE INVENTION

Systems and methods are provided for authentication by combining one or more Reverse Turing Tests (RTTs) with password-based user authentication protocols to provide improved resistance to brute force attacks. In accordance with one embodiment of the invention, a method for user authentication includes receiving a username/password pair associated with a user; requesting one or more responses to a first Reverse Turing Test (RTT); and granting access to the user, if a valid response to the first RTT is received and the username/password pair is valid.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The present invention will be readily understood by reference to the following detailed description in conjunction with the accompanying drawings, wherein like reference numerals designate like structural elements, and in which.

DETAILED DESCRIPTION

Figure 1:
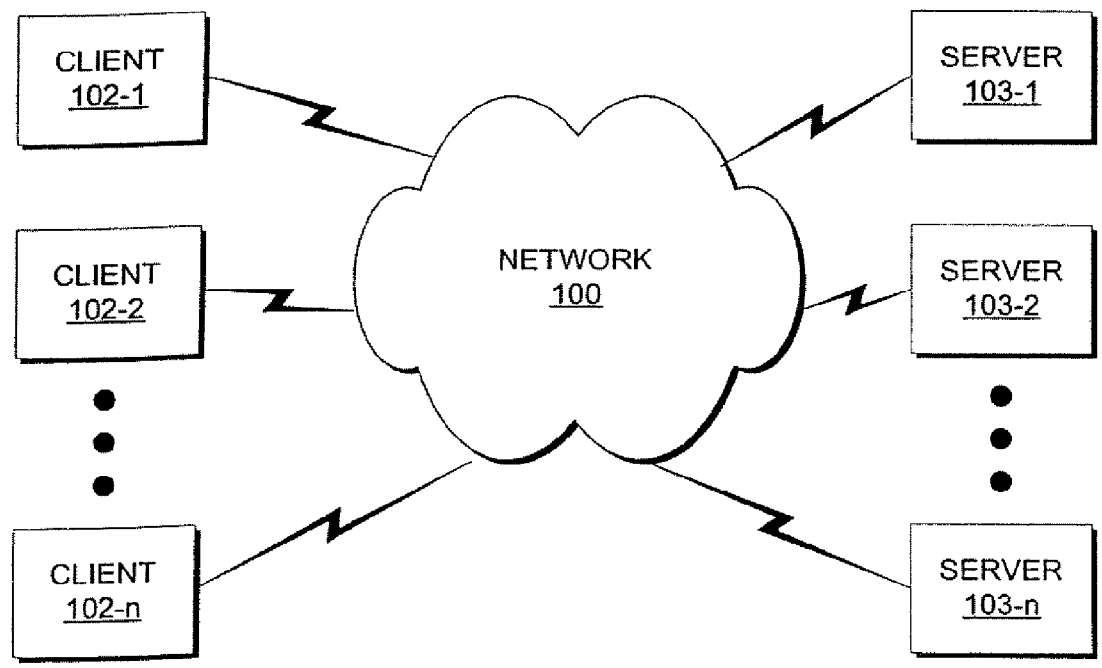
FIG. 1 illustrates a system for practicing embodiments of the present invention.

A detailed description of the invention is provided below. While the invention is described in connection with several illustrative embodiments, it should be understood that the invention is not limited to any one embodiment. On the contrary, the invention encompasses numerous alternatives, modifications, and equivalents. For example, while several embodiments are described in the context of a client-server architecture, the present invention can be applied in any context in which RTT authentication and passwords are beneficial. In addition, while numerous specific details are set forth in the following description to provide a thorough understanding of the present invention, it should be appreciated that the present invention may be practiced according to the claims without some or all of these details. Finally, certain technical material that is known in the art has not been described in detail in order to avoid obscuring the present invention.

Embodiments of the present invention provide systems and methods that uniquely combine Reverse Turing Tests (RTTs) with password-based user authentication systems. Generally speaking, RTTs are tests that attempt to distinguish between a human user and an automated program. They should be relatively easy for humans to pass, yet difficult for computer programs to answer. An example of an RTT is one that displays a convoluted graphical image of an alphanumeric character string and asks the user to type the string that appears in the image (the size of the image is typically between 6K to 30K bytes). RTTs can be used to prevent automated programs from accessing different features of web sites. For example, Yahoo! and Paypal require users that attempt to open an account to pass an RTT, and Alta Vista requires users that are submitting urls to pass an RTT. Examples of RTTs, as well as source code, are available at http://www.captha.net. Additional examples of RTTs that could be used in connection with embodiments of the present invention are described in a commonly-assigned patent application Ser. No. 10/423,546, now U.S. Pat. No. 7,149,899, entitled "Establishing a Secure Channel with a Human User," filed on Apr. 25, 2003 the entire contents of which are hereby incorporated by reference.

Having strong user authentication schemes for identity services such as Microsoft Passport or Liberty Alliance is desirable since these identity services may store sensitive information (e.g., credit card number and billing address) that could be abused in numerous ways. Since the vision of these services is to enable a "single sign on" to the Internet, breaking into an account at an identity service could theoretically enable an attacker to gain access to every account that a user has with numerous Internet sites, giving the attacker vast information about the individual, ranging from financial data, to purchase histories, to personal email accounts. In addition, identity services enable access to novel types of web services, such as MyCalendar and MyMusic, which aim to store user information and perform presence management for applications like instant messaging. By "moving personal data from the PC into the network cloud" these services can act as agents for users and can give users access to their information from a number of devices. This vast amount of information—which becomes available to an attacker who succeeds in breaking into an account—facilitates impersonation or crimes like identity theft.

The present invention is particularly well suited for identity service applications, as it can be implemented with only a minimal user interface that can be provided by a number of end point devices. For example, devices like cell phones, which might not allow for the display of an image-based RTT, might use audible RTTs instead such as RTTs related to the human recognition of spoken words in a noisy environment.

Embodiments of the systems and methods described herein may have many beneficial attributes. For example, the user authentication scheme described herein may be easy for end-users to use and have a relatively low cost of deployment. Furthermore, the authentication protocol described herein may be universally deployable so that users can authenticate themselves from any device from which they may want to use the service. For example, users can log into a bank account, stock trading account, or email account from any location using any device, such as Internet-enabled PDA, cell phone, personal computer, television set-top box, etc.

In at least some embodiments, the authentication techniques may be secure, i.e. only the intended user should be able to log into his or her account. In at least one embodiment, the user is not required to install new hardware. This can be advantageous, since buying and distributing new hardware, such as smartcard readers, smartcards, or authentication tokens, can be expensive, and the distribution of these devices will typically not be universal, thus preventing anytime-anywhere access to accounts. For example, a PDA or an Internet Café may not have a smartcard reader.

In some embodiments, the user is not required to install new software. Installing new software creates extra usability hurdles, and services that want to provide good usability typically try to keep the number of clicks a user needs to make as low as possible. Another problem with requiring new software is that it may compromise the goal of providing users with universal access (e.g., a well-managed Internet Café typically will not—and should not for security reasons—allow users to install new software). If, for example, users have to use public/secret key pairs that are stored on their home machines, this can create a portability problem. If a user logs on from a new machine, the keys or other locally stored credentials typically will not be available, and extra mechanisms will be needed for their transfer (and subsequent removal, if the use is only temporary). In at least some embodiments, the systems and methods of the present invention will not dramatically decrease the quality of the user experience. Users have accepted passwords as a common authentication method. From a service provider perspective, authentication techniques that might turn out to be confusing for even a relatively small fraction of a large user base can easily turn out to be very expensive.

Embodiments of the present invention can be used to enhance the security of existing authentication methods against automated attacks in any scenario in which RTTs can be rendered. Examples of uses for the authentication technique include browser-based authentication over the Internet, such as electronic mail, auctions, or online banking. Such services could deploy the scheme to enhance the security of existing login procedures. Other examples include identity services such as Microsoft Passport or Liberty Alliance, authentication from mobile devices such as Internet-enabled cell phones and PDAs, and authenticating users to corporate services such as extranets and enterprise portals.

In an enterprise portal application, examples of uses for the authentication technique include defending against attacks where competitors attempt to lock out customers of the portal. For example, if a pre-sales team that is out in the field needs to access critical information from the portal shortly before attempting to close a deal, a competitor could attempt to lock them out. In general, the tendency to connect business partners via enterprise portals opens a number of possibilities to stage denial of service attacks to block access to sites, particularly if user names are known.

In yet another example, authentication techniques may be used to authenticate government users. Government and enterprise applications might require enhanced security against denial of service attacks. In another example, authentication techniques may be used to authenticate users of a smartcard. In this scenario users authenticate themselves using a smartcard, in order to authorize transactions. The risk is that a lost smartcard might be attacked using a dictionary attack in order to find the correct PIN that is used by its owner. A protocol in accordance with the present invention can be used to thwart this risk. Further, the techniques may be used to guard against denial of service attacks on smartcard applications. Smartcards typically require a user to authenticate himself by entering a password or PIN. To prevent brute force attacks, smartcards typically lock out users after a small numbers of attempts. Reactivating the smart card for a user that has inadvertently locked himself out is often a cumbersome process that involves connecting to a central support service.

Other examples of use include authenticating users for the purpose of password recovery and securing user authentication that is done using personal information of the user, rather than passwords. The personal information might include items like mother's maiden name, social security number, pet's name, birthplace, etc.

FIG. 1 is an example of an illustrative system for practicing embodiments of the present invention. FIG. 1 shows a client-server environment such as the World Wide Web (the web). In this environment, clients 102 communicate with servers 103 over a network 100 such as the Internet. For example, client computers 102 may request access to services or data stored on servers 103, and before granting access to these services or data, servers 103 may authenticate the users of client computers 102 using the techniques described herein.

It will be appreciated that the terms "client" and "server" are used to generically refer to a computer's general role as a requester or recipient of data (the client) or as a provider of data (the server). It should be appreciated, however, that the terms "computer," "client," and "server" can be used to refer to any computer or computer system, including, personal computers, television set-top boxes, personal digital assistants (PDAs), cellular or other telephones, client-side computers, server-side computers, and the like. Web clients 102 and web servers 103 typically communicate using a protocol such as the Hypertext Transfer Protocol (HTTP). In the web environment, web browsers reside on clients and render web documents (pages) served by web servers. In other embodiments, peer-to-peer or other networking arrangements may be used. It should be appreciated that the systems and methods of the present invention are not limited in application to the Internet, the World Wide Web, or any other particular network architecture or environment, and can be used in virtually any type of computing context, regardless of the type of network that is used. Indeed, embodiments of the present invention can also be practiced in non-networked systems—for example, as a means of providing secure access to a local, non-networked computer or database.

Figure 2:
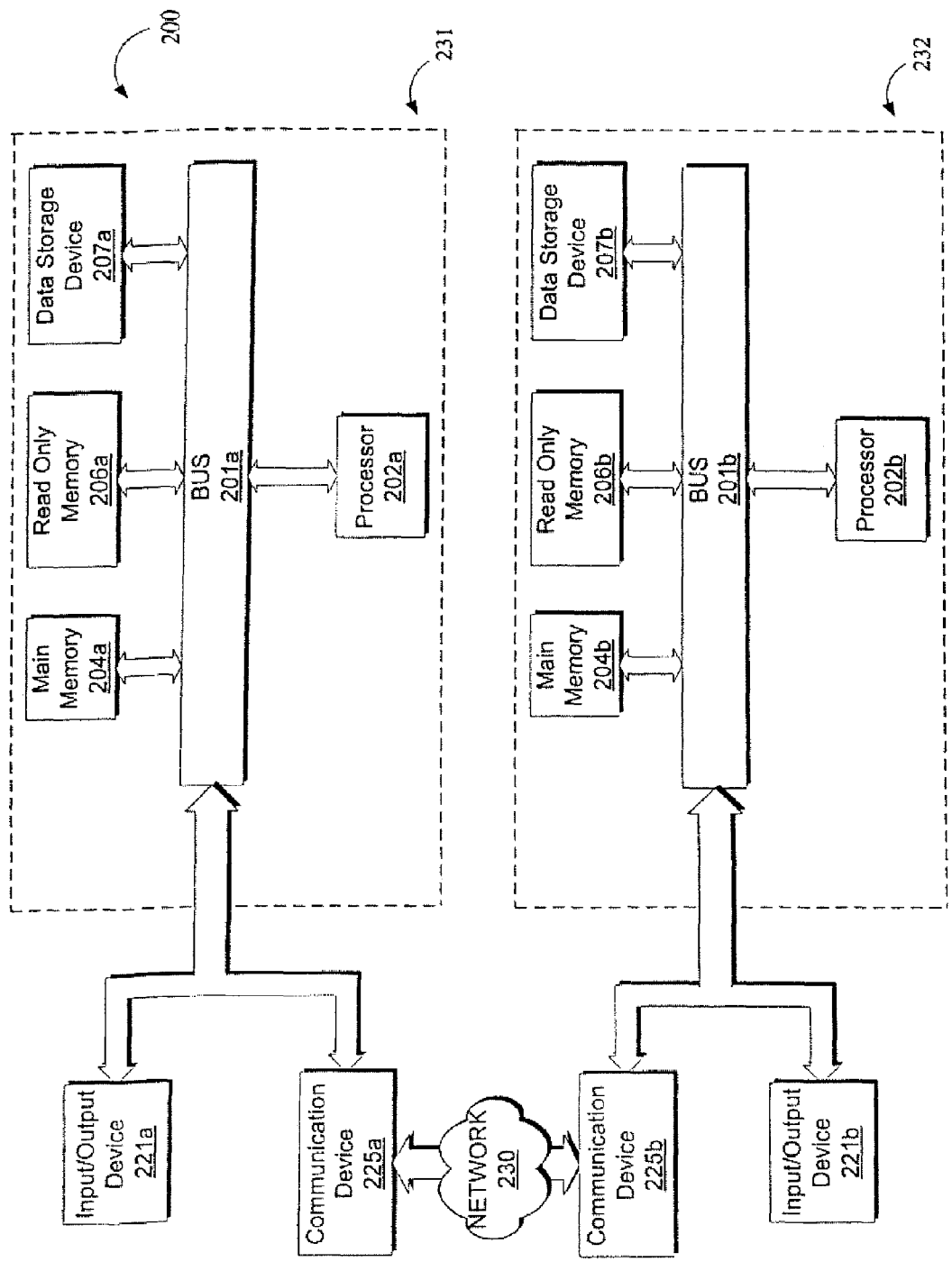
FIG. 2 provides a more detailed illustration of a computer system in accordance with embodiments of the present invention.

FIG. 2 provides a more detailed example of an illustrative computer system 200 (such as client 102 and/or server 103) for use in practicing embodiments of the present invention. The example system shown in FIG. 2 includes a first computer 231 and a second computer 232. The first and second computers may, in some embodiments, be configured to have protected computing environments- such as those described in commonly-assigned U.S. Pat. No. 5,892,900, entitled "Systems and Methods for Secure Transaction Management and Electronic Rights Protection," issued Apr. 6, 1999 ("the '900 patent") and U.S. Pat. No. 6,185,683, entitled "Trusted and Secure Techniques, Systems and Methods for Item Delivery and Execution," issued Feb. 6, 2001 (the entire contents of both of these patents are hereby expressly incorporated herein by reference); however, this is not necessary for purposes of practicing the present invention. While FIG. 2 shows first and second computers having similar sets of components, it will be appreciated that in other embodiments, either or both of the computers may possess additional components and/or some suitable subset of the components illustrated in FIG. 2. Referring to FIG. 2, illustrative computers 231 and 232 each typically comprise some or all of the following components: a processor 202 for processing information; a computer storage medium including random access memory (RAM) or other dynamic storage device 204 (sometimes referred to as "main memory") for storing information and instructions to be executed by processor 202 and/or for storing temporary variables or other intermediate information during execution of instructions by processor 202; a computer storage medium including read only memory (ROM) 206 and/or some other static storage device for storing information and instructions for processor 202; a computer storage medium including a data storage device 207 such as a magnetic disk or optical disc and its corresponding drive; one or more input/output devices 221, such as a cathode ray tube (CR1) or liquid crystal display (LCD) device; audio speakers; an alphanumeric input device such as a keyboard and/or a cursor control device such as a mouse or a trackball for communicating information and/or command selections to processor 202; a communication device 225, such as a modem, a network interface card, or other commercially available network interface device for accessing the second computer and/or remote clients and/or servers via a network 230 such as the Internet, a private corporate network, a local-area network, a wide-area network, a wireless network, or the like; and one or more buses 201 for coupling the aforementioned elements together.

The operation of computer 231 and computer 232 is controlled primarily by programs stored in each computer's memory and executed by each computer's processor 202. These programs typically include an operating system, a web browser, and one or more other applications.

Figure 3:
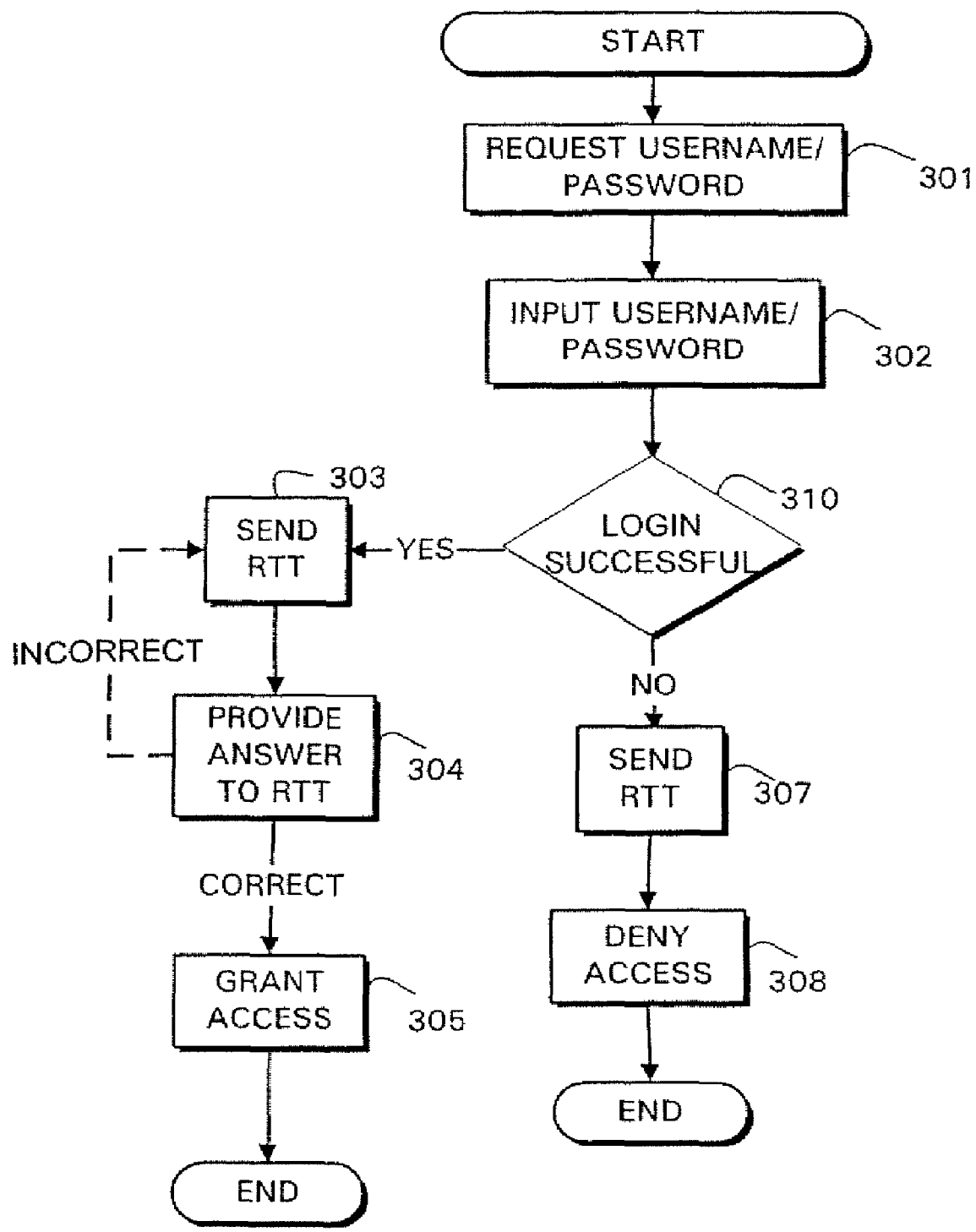
FIG. 3 illustrates an authentication protocol in accordance with embodiments of the present invention.

Referring to FIG. 3, a method of performing user authentication is shown. In step 301, a user is prompted to enter a user name and a password. In another embodiment, the username and/or password are automatically entered. For example, the username and password may be remembered from a previous attempt at access. In step 302 the user inputs a user name and password. The input is checked, and if the user name/password login is successful (the user name is valid and the password agrees with the user name—i.e., a "Yes" exit to block 310) then an RTT is sent to the user (303). In an embodiment, the RTT is a deterministic function of the user name/password input. In other embodiments, the name/password input could be a non-deterministic or random function that may or may not depend on these values. In response to receiving the RTT, the user provides an answer (304). If the user gives the wrong answer to the RTT, he or she is notified that the login attempt failed and the cycle may continue for a predetermined number of times (denoted by the dashed line in FIG. 3), or, alternatively, the user may be locked out based upon one failure. If the user answers the RTT correctly, he or she is allowed to use the system (305).

In some embodiments, the protocol may allow for slight variations in RTT answers. A common mistake is to mistype or misidentify one of the characters in the answer. An error-resilient protocol could accept, in addition to the correct answer, other answers that are within a "small distance" of the correct answer. For example, these could be answers in which one of the letters is missing or incorrect. While this may increase the probability of the adversary breaking the RTT, if implemented correctly, it may not be by a significant factor.

Referring once again to FIG. 3, if the username/password login attempt fails (because the user name is invalid or does not match the password—i.e., a "No" exit from block 310), then an RTT is sent to the client (307). The user answers the RTT, and regardless of the answer, he or she is told that the login attempt failed (308).

Note that while FIG. 3 illustrates one embodiment of the present invention, there are many modifications that can be made to the protocol shown in FIG. 3 without departing from the principles of the invention. For example, step 307 need not be performed each time an unsuccessful login is detected. Instead, in the more general case, step 307 could be performed in response to an unsuccessful login attempt with a probability of p (where p is a parameter that is greater than or equal to 0 and less than or equal to 1); and, with probability 1-p, the user could simply be notified that the login attempt failed (i.e., without first receiving an RTT). An advantage of the simplified embodiment shown in FIG. 3 is that the interaction of the user with the authentication procedure is substantially the same regardless of whether the user enters a correct user name/password pair (at least up to the point where the user is granted access to system). Thus, an adversary is effectively prevented from gaining information about the password, except for the case when it enters a correct user name/password pair and answers the RTT correctly.

In one embodiment, if an incorrect username/password pair is entered, the decision on whether to ask the user to answer an RTT depends on the username and password. Some usernames may be associated with increased security and lead to different actions. It may also be advantageous to design the system such that the time that it takes the authentication procedure to answer the user is substantially the same, regardless of whether the user name/password pair is correct.

Automated attacks are thwarted, since the attacker needs to answer RTTs for at least a fraction of the login attempts. Assuming that RTTs are secure, this requires the attacker to use human input for a certain percentage p of the login attempts. This might be a hard task even if p is small (even if p=0.01 and the domain of possible passwords contains 100, 000 strings). This property holds whether the attacker is attacking a specific user or is checking different user name/password pairs. Even if someone comes up with a smart program that is able to break RTTs that are currently considered secure, then (1) if the program takes a moderate amount of time to run, say one minute, it would still slow down the attacker considerably, and (2) it should be easy to replace the RTT with a stronger one. It will be appreciated that p is a parameter, and should be set according to the specific application or scenario in which it is used. For example, the more likely it is that an adversary can answer RTTs correctly, the higher p should be.

Usability can be improved by postponing the RTT until after the password is entered, and/or by making the challenge a deterministic function of the user name/password pair. In embodiments that make use of such a deterministic function, the user can be given the same challenge each time he or she logs in correctly, and the process of answering the challenge can be expected to become fairly automated (mentally) for the user. In other embodiments, the protocol can use RTTs that are not a deterministic function of the user name and password. For example, a random RTT can be served to the user each time he or she needs to pass an RTT. This allows for the precomputation of random RTTs, since they do not depend on the user name/password pair provided during the actual authentication process. A usability advantage of this scheme is that the RTT and the username/password pair can be presented at the same time on the login screen, whereas a scheme in which the RTT depends on the username/password will generally have two rounds: first, the entered pair is transmitted from the user, then the RTT is computed by the server and sent back to the user. From a software architecture perspective, a single login screen simplifies the interface and no username/password information needs to be transferred to the RTT generator. The RTT generator may simply output pairs of RTTs and the encoded strings that the server can use during the authentication process.

In another illustrative embodiment, cookies are used to minimize the number of RTTs a user needs to answer. To reduce the number of RTTs, the server stores information about machines from which the user has already authenticated himself or herself correctly. All or part of this information can be stored in a cookie on the user's machine. There are, however, many alternative ways for keeping this information: for example, by storing it at the server, or using ip numbers of the machines that were used by the server. The cookie on a machine shows that a user has already successfully completed a combination of an RTT and a correct password from that machine. Since a typical user makes most of his or her login attempts from a small set of computers, and an attacker probably uses a computer that does not belong to this set (at least if the attacker mounts an automated dictionary attack, rather than just trying to type a few likely passwords), it is possible to remove the requirement of passing an RTT for login attempts that are made from computers that the user previously used to successfully access his or her accounts. Thus, it is likely that most users would be asked to answer an RTT very rarely. This feature can be added without substantially reducing the security of the system.

Figure 4:
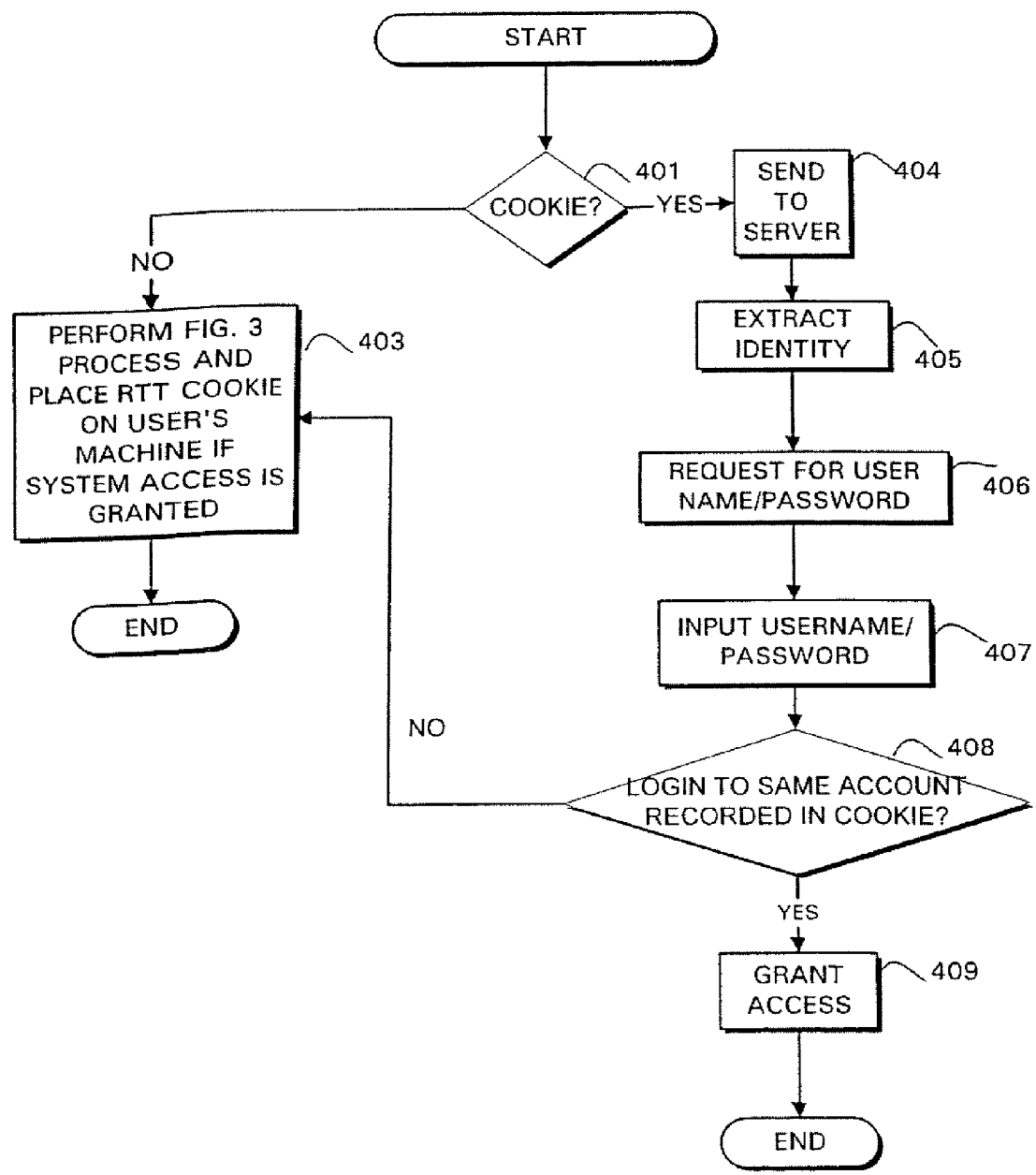
FIG. 4 illustrates an authentication procedure that makes use of cookies.

FIG. 4 illustrates an authentication procedure that makes use of cookies. An "RTT cookie," preferably containing a unique user identifier and a cryptographic or other code, such as a MAC from a secret known only to the server, to protect against forgery, is stored on the user's machine when the user successfully accesses his or her account from that machine. As shown in FIG. 4, when a user attempts to log into his or her account from that machine on a subsequent occasion, the server checks to see if the cookie is present (401). If there is not a valid cookie on the user's machine (i.e., a "No" exit to block 401), then a process is performed that is substantially the same as that set forth in FIG. 3. If the password and RTT are entered correctly during this process, the server places a cookie on the user machine and grants access to the account (403). However, if there already is a cookie on the user's machine (i.e., a "Yes" exit from block 401), then the cookie is sent to the server (404), the server extracts the user's identity from the cookie (405), and presents the user with a standard log-in screen (406) in which he or she enters a username/password pair (407). If the user login is to a different account than is recorded in the cookie (i.e., a "No" exit to block 408), then the login process is substantially the same as the method set forth in FIG. 3. If the user logs into the same account that was recorded in the cookie (i.e., a "Yes" exit to block 408), then the user is not asked to pass an RTT, and provided that the user's password and user-name match, the user will be granted access to his or her account (409). In one embodiment, if the login attempt fails, a counter is updated at the server. After some predefined number (e.g., 100) of failed login attempts with the same cookie, the account is flagged and further login attempts may require an RTT until a successful login attempt is made. It should be appreciated that the threshold at which the account is flagged is a parameter, and any suitable number may be chosen depending upon the circumstances.

It is reasonable to assume that an automated attacker cannot easily steal a cookie from a user account. Thus, he will have to pass an RTT for a p fraction of his login attempts. Even if an attacker manages to steal a cookie, it will only enable it to try, say 100, login attempts without answering an RTT. After failing in these attempts (which will be the most likely case) the attacker has to start answering RTTs again.

For the vast majority of users, the user experience would not be much different from their current experience in account login, except for answering an RTT when they use a new machine. In alternative embodiments, since legitimate users only have to pass a very small number of RTTs, the protocol may also be run such that the RTT is no longer a function of the entered user name and the password. Instead a random RTT (and/or multiple RTTs) could be generated each time a user needs to pass an RTT. This protocol variant allows for a precomputation of a number of random RTTs that can be stored, and may also increase the security of the RTT process.

In addition, the present invention can also be used in combination with traditional cookie-based authentication. For example, the server can place both an authentication cookie and a "RTT cookie" on the user's machine (or could combine these two cookies into a single cookie). An advantage of keeping these cookies separate is that an RTT cookie can be long lived, whereas authentication cookies may have a limited lifetime and/or expiration date, or they may be automatically removed when a user exits his or her browser.

In addition, the methods described herein enable several users to use the same machine to authenticate themselves to the same service, or to different services. Each service should keep a single cookie, or sufficiently many cookies, to support the protocol for all users.

Regarding the security of RTTs, it seems reasonable to assume that the probability that an automated adversary can guess the answer to an RTT is close to a random guess of the answer. Even if an adversary can answer an RTT with a non-trivial computational amount, say t seconds on a Pentium 3, as long as t is large enough, the costs of hardware and time that it will take an adversary to break into an account will be relatively high. The value of the parameters could be set according to the estimate of t.

The present invention is not only useful for applications in which users choose their own passwords, but also for applications in which the password is defined by the application (for example, as a random 4 digit number). Such applications are susceptible to dictionary attacks, since users typically can only remember relatively short passwords that have low entropy.

It will generally be desirable to prevent an adversary from readily distinguishing between successful and unsuccessful login-attempts, thus requiring the adversary to pass many RTTs even if the adversary guesses the wrong username/password scheme. It is thus advantageous to eliminate side channels that allow an automated adversary to distinguish between correct and incorrect pairs with probability better than the one that can be trivially derived from the system parameter p. In embodiments where the RTT is a deterministic function of the username and/or password, the server may wish to cache the "correct" RTTs, while computing new RTTs on the fly that correspond to "wrong" username/password pairs. However, to protect against side channel attacks, care is preferably taken to control the timing of the presentation of RTTs to the user, so that an adversary cannot distinguish between instances in which a cached RTT is served versus instances in which a newly computed RTT is served by measuring the time it takes the server to serve the RTT. In addition, mechanisms like password recovery schemes can be designed to protect against side channel attacks by avoiding giving a user feedback about whether an entered user/name password pair is correct. In addition, in order to make it more difficult for an adversary to gather a list of valid usernames, in some embodiments error messages like "user name not known," etc. are avoided, although this will generally need to be balanced against other usability requirements in a given implementation.

To analyze the security of the protocols, it is helpful to assume that the function generating the RTT is publicly known (in particular, to an adversary). In one embodiment, the RTT is generated by this function using at least two inputs: (1) a random "key", and (2) information that enables the verification of the user's answer. In one embodiment, a random "key" with high entropy is used to generate the RTT from the user name and password. For example, the random key can be used to first generate a random string ("answer") from the username/password pair, and then generate a random looking representation that is presented to the user. The "answer" string should be the correct answer to the RTT. It will be appreciated that there are a number of ways to implement this process, and that any suitable one can be chosen for purposes of practicing the present invention. For example, the username/password pair can be encrypted using a 128-bit symmetric value which is the "key," or by applying a randomly chosen (and secret) pseudorandom function to the username/password pair.

In another illustrative embodiment, an RTT-based construction is used directly for the login procedure. The RTT preferably has the following properties:

It allows a user to easily enter his or her standard password.

The probability that an automated attacker can guess the correct answer to the RTT is orders of magnitude lower then the probability that he guesses the password directly.

RTTs with these properties will be referred to as "RTTs with high machine entropy".

The server generates an image and displays it to the user. The server has a mapping from locations in the image to values. For example, the image might display characters, and the server could know how to associate different locations in the image with different characters. The sender presents to the user a target string and asks him to point, in order, to the locations in the image that correspond to the characters of this string. The user passes the test if he or she does this correctly.

In one illustrative embodiment, the RTT can be constructed as a 10×10 "chessboard" or matrix, in a rendering that should be easy for humans to read but hard for computers to decode:

The letters of a predefined alphabet are entered into random entries of the matrix as letters that are hard to recognize by an automated adversary (for ease of explanation, the alphabet will be assumed to consist of 25 letters), and The other 75 fields are filled with random images.

In the resulting chessboard RTT, the letters might appear in alphabetical order, with some gaps filled by random images.

User authentication using this RTT could be performed as follows:

1. When a user attempts to log in, the server generates an RTT at random and sends it to the user.
2. The user clicks on the locations of the RTT that correspond to his username and/or password. The result consists of the ordered list of entries (k,1) in the matrix that the user has clicked on. This list is sent to the server.
3. The server checks the result and grants access if the user-password pair is correct.

This authentication method may also be used with a touch-screen. It will be appreciated that other types of RTTs with high machine entropy could be constructed. For example, the protocol could use any location based RTT. It is preferable that a click on a random location in the image would not be mapped to any character and would therefore be void. It is also preferable that an automated adversary would not be able to tell between a location that maps to a character and a location that does not map to any character.

To facilitate discussion of the security of example scheme discussed above, it is assumed that an adversary cannot distinguish between random images and letters in the image with a probability better then random guessing. The canonical strategy that an automated adversary will pick is to guess the correct output list $((k1,l1), \ldots, (km,lm))$ of matrix entries at random for a username/password pair of length m. The ratio of letters to random images in the example RTT is ¼. Thus, the probability that an automated adversary guesses the output correctly is about $4^m$ times lower then the probability of guessing correctly the (username, password) pair without the RTT. If, the user-password combination has 12 letters, the probability of guessing the output of the RTT correctly is $4^{12}$~16 million times lower than guessing only the username/password pair.

To enhance the usability of this scheme, and to lower the number of RTTs a server has to generate, the protocol can be modified so that the user enters his username in a standard form and is then served an RTT only to enter his password. By making the RTT a function of the username, a user sees the same RTT every time he tries to login.

It may also be desirable to maintain resistance against an automated adversary who has access to human help. In real life scenarios, the amount of human help can probably be expected to be bounded and quantifiable. Human help might be used to identify the letters in the chessboard RTT. The strategy we suggest is that the server logs the number of failed attempts for the login to a particular account. Above a certain threshold the server chooses to replace the old RTT by a new randomly generated one. Note that only the RTT is changed but the user is not locked out at this threshold that still protects against denial of service attacks.

We note that using the cookie techniques this "RTT with high machine entropy" can be used in connection with the procedure illustrated in FIG. 4 by replacing the combination of RTTs+log-in screen by RTTs with high machine entropy.

A user-friendly system will typically wish to present as few RTTs as possible to legitimate users. However, in order to obtain good security the system should also make the operation of an attacker as hard as possible. One way to balance these considerations is to dynamically increase the number of RTT challenges when the system senses that it is under attack. The increase in the number of RTTs may be done by increasing the parameter p, or even by requiring users to answer several RTTs for every login attempt by using a parameter p that is greater than 1, say p=3, and p being the expected number of RTTs that are presented for each login attempt.

The system can use any suitable mechanism to determine that it is under attack. For example, the system can monitor the ratio of failed login attempts, and take countermeasures, such as increasing the number of RTTs in the manner described above, if the ratio becomes higher than usual—either for a single user or globally. The system may also, or alternatively, monitor the number of successive, and/or non-successive, failed login attempts to the same account. The system could count all failed login attempts, and/or failed login attempts in which the attacker successfully answered the RTT but did not know the password. The latter case might hint that the attacker is using human help to break the RTT, or that the attacker had figured out a way to do it automatically.

As indicated previously, embodiments of the present invention can ameliorate the scalability problems of other authentication techniques by sending a challenge only for a fraction of the failed login attempts (p), as well as for all successful login attempts, a login attempt for which the username/password, but not necessarily the RTT, is correct. The user is granted access to the system if the login attempt is successful and the RTT is answered correctly. Scalability is enhanced since: (1) for every user, the challenge that is displayed for successful login attempts can be stored at the servers rather than generated after the password is verified; and (2) for failed login attempts, an RTT can be generated only for a fraction of the cases. This means that a server that receives S successful login attempts and F failed ones, need only generate an RTT for F*p attempts, compared to the greater number of generations of RTT that would have been required if an RTT was generated for every login. This login procedure should enable the system administrator to increase the threshold of failed login attempts that triggers an account lock out, thus making denial of service attacks much harder.

Although the foregoing invention has been described in some detail for purposes of clarity, it will be apparent that certain changes and modifications may be made without departing from the principles of the present invention. It should be noted that there are many alternative ways of implementing both the processes and apparatuses of the present invention. Accordingly, the present embodiments are to be considered as illustrative and not restrictive, and the invention is not to be limited to the specific details given herein.

The invention claimed is:

1. A method for user authentication, the method comprising:

requesting, by a processor, username and password information from a user;

receiving, by the processor, a username/password pair associated with the user;

determining, by the processor, whether the username/password pair is valid;

requesting, by the processor, one or more responses to a first Reverse Turing Test (RTT), regardless of whether the username/password pair is valid;

selectively, by the processor, granting the user access to a resource only if the username/password pair is valid, and one or more responses to the first RTT is valid; and generating, by the processor, a cookie if the user is granted access to the resource, wherein the cookie indicates that the user was authenticated.

2. The method of claim 1, wherein the cookie is stored at least on the user's computing device.

3. The method of claim 1, wherein the cookie is stored on a server.

4. The method of claim 1, wherein the user enters the username/password pair manually.

5. The method of claim 1, wherein the username/password pair is automatically entered.

6. The method of claim 1, wherein the first RTT is independent of the username/password pair.

7. The method of claim 1, wherein the first RTT is a non-deterministic or random function that depends on the username/password pair.

8. The method of claim 1, wherein the first RTT is presented only after receiving a username/password pair.

9. The method of claim 1, wherein the request for username and password information and the request for one or more responses to the first RTT are presented simultaneously.

10. The method of claim 1, wherein a time between (a) performing the step of receiving a username/password pair and (b) performing the step of requesting one or more responses to a first RTT is substantially the same regardless of whether the username/password pair is valid.

11. The method of claim 1, wherein the first RTT comprises at least one of:
 (a) a deterministic function of the username/password pair;
 (b) a non-deterministic function; or
 (d) a random function.

12. The method of claim 1, wherein the first RTT comprises an audible sound.

13. The method of claim 1, wherein the resource comprises at least one of:
 a bank account;
 an Internet auction;
 a stock trading account; or
 an email account.

14. The method of claim 1, further comprising: selectively notifying, by the processor, the user that authentication has failed if the user gives an invalid response to the first RTT.

15. The method of claim 14, further comprising preventing, by the processor, the user from accessing the resource for a predetermined period of time after a failed authentication.

16. The method of claim 14, further comprising determining, by the processor, that the response is invalid if it is not within a predetermined margin of error of a valid response.

17. The method of claim 1, wherein the first RTT is a deterministic function of the username/password pair.

18. The method of claim 17, wherein when a particular username/password pair is received, the RTT selected is always the same for each authentication attempt.

19. The method of claim 17, wherein a new RTT is generated only when a user provides an invalid response to the first RTT.

20. The method of claim 17, wherein a function used to generate the first RTT is publicly known.

21. The method of claim 1, wherein the first RTT comprises an image on which the user is instructed to locate certain characters.

22. The method of claim 21, wherein the user enters a password by clicking the appropriate characters on the first RTT.

23. The method of claim 21, wherein the user uses a touch screen to respond to the first RTT.

24. The method of claim 1, further comprising monitoring, by the processor, a ratio of failed login attempts for each of a plurality of users.

25. The method of claim 24, further comprising increasing, by the processor, the difficulty of the first RTT for a user if a ratio of failed login attempts for the user reaches a predetermined limit.

26. The method of claim 1, further comprising monitoring, by the processor, a global ratio of failed login attempts for a plurality of users.

27. The method of claim 1, further comprising: maintaining, by the processor, a record for each user of the Internet Protocol (IP) address of the machine used for each successful authentication by that user.

28. The method of claim 27, further comprising: allowing, by the processor, the user to access the resource if the user's current IP address matches an IP address of a machine from which the user was previously authenticated, regardless of the user's response to the first RTT.

29. The method of claim 1, further comprising: determining, by the processor, if a valid cookie exists.

30. The method of claim 29, further comprising: if a valid cookie exists, granting, by the processor, the user access to the resource.

31. The method of claim 29, wherein:
 the username/password pair received from the user is a first username/password pair; and
 wherein the user is granted access to the resource regardless of the user's response to the first RTT if the first username/password pair matches a second username/password pair stored in the cookie.

32. The method of claim 31, wherein:
 if the first username/password pair does not match a second username/password pair stored in the cookie, a login counter is increased; and
 after the login counter reaches a predefined value, the user is required to provide a valid username/password pair and answer an RTT correctly before being granted access to the resource.

33. A computer storage medium, the computer storage medium storing programming instructions which, if executed by a computer system, are operable to cause the computer system to perform operations comprising:
 requesting username and password information from a user;
 receiving a username/password pair associated with the user;
 determining whether the username/password pair is valid;
 requesting one or more responses to a first Reverse Turing Test (RTT), regardless of whether the username/password pair is valid;
 selectively granting the user access to a resource only if the username/password pair is valid, and one or more responses to the first RTT is valid; and
 generating a cookie if the user is granted access to the resource, wherein the cookie indicates that the user was authenticated.

34. The computer storage medium of claim 33, further comprising programming instructions which, if executed by a computer system, are operable to cause the computer system to perform operations comprising:

selectively notifying the user that authentication has failed if the user gives an invalid response to the first RTT.

35. The computer storage medium of claim 34, further comprising programming instructions which, if executed by a computer system, are operable to cause the computer system to perform operations comprising preventing the user from accessing the resource for a predetermined period of time after a failed authentication.

36. The computer storage medium of claim 34, further comprising programming instructions which, if executed by a computer system, are operable to cause the computer system to perform operations comprising determining that the response is not valid if it is not within a predetermined margin of error of a valid response.

37. The computer storage medium of claim 33, further comprising programming instructions which, if executed by a computer system, are operable to cause the computer system to perform operations comprising:

maintaining a record for each user of the Internet Protocol (IP) address of the machine used for each successful authentication by that user.

38. The computer storage medium of claim 37, further comprising programming instructions which, if executed by a computer system, are operable to cause the computer system to perform operations comprising:

allowing the user to access the resource if the user's current IP address matches an IP address of a machine from which the user was previously authenticated, regardless of the user's response to the first RTT.

39. The computer storage medium of claim 33, further comprising programming instructions which, if executed by a computer system, are operable to cause the computer system to perform operations comprising:

determining if a valid cookie exists.

40. The computer storage medium of claim 39, further comprising programming instructions which, if executed by a computer system, are operable to cause the computer system to perform operations comprising:

granting the user access to the resource if a valid cookie exists.

41. The computer storage medium of claim 39, wherein the username/password pair received from the user is a first username/password pair; the computer storage medium further comprising programming instructions which, if executed by a computer system, are operable to cause the computer system to perform operations comprising:

granted the user access to the resource regardless of the user's response to the first RTT if the first username/password pair matches a second username/password pair stored in the cookie.

42. The computer storage medium of claim 41, further comprising programming instructions which, if executed by a computer system, are operable to cause the computer system to perform operations comprising:

incrementing a login counter if the first username/password pair does not match a second username/password pair stored in the cookie; and requiring the user to provide a valid username/password pair and to answer an RTT correctly before being granted access to the resource after the login counter reaches a predefined value.

* * * * *